March 10, 1964 J. S. BOZEK ETAL 3,124,065
METHOD AND MACHINE FOR PRINTING PLASTIC BOTTLES
Filed Aug. 8, 1960 10 Sheets-Sheet 1

INVENTORS
JOHN S. BOZEK
& JUSTIN SIMPSON
BY
Mason, Porter, Diller & Stewart
ATTORNEYS INVENTORS
JOHN S. BOZEK
& JUSTIN SIMPSON
BY
Mason, Porter, Diller & Stewart
ATTORNEYS March 10, 1964   J. S. BOZEK ET AL   3,124,065
METHOD AND MACHINE FOR PRINTING PLASTIC BOTTLES
Filed Aug. 8, 1960   10 Sheets-Sheet 4

INVENTORS
JOHN S. BOZEK
& JUSTIN SIMPSON
BY
Mason, Porter, Diller & Stewart
ATTORNEYS

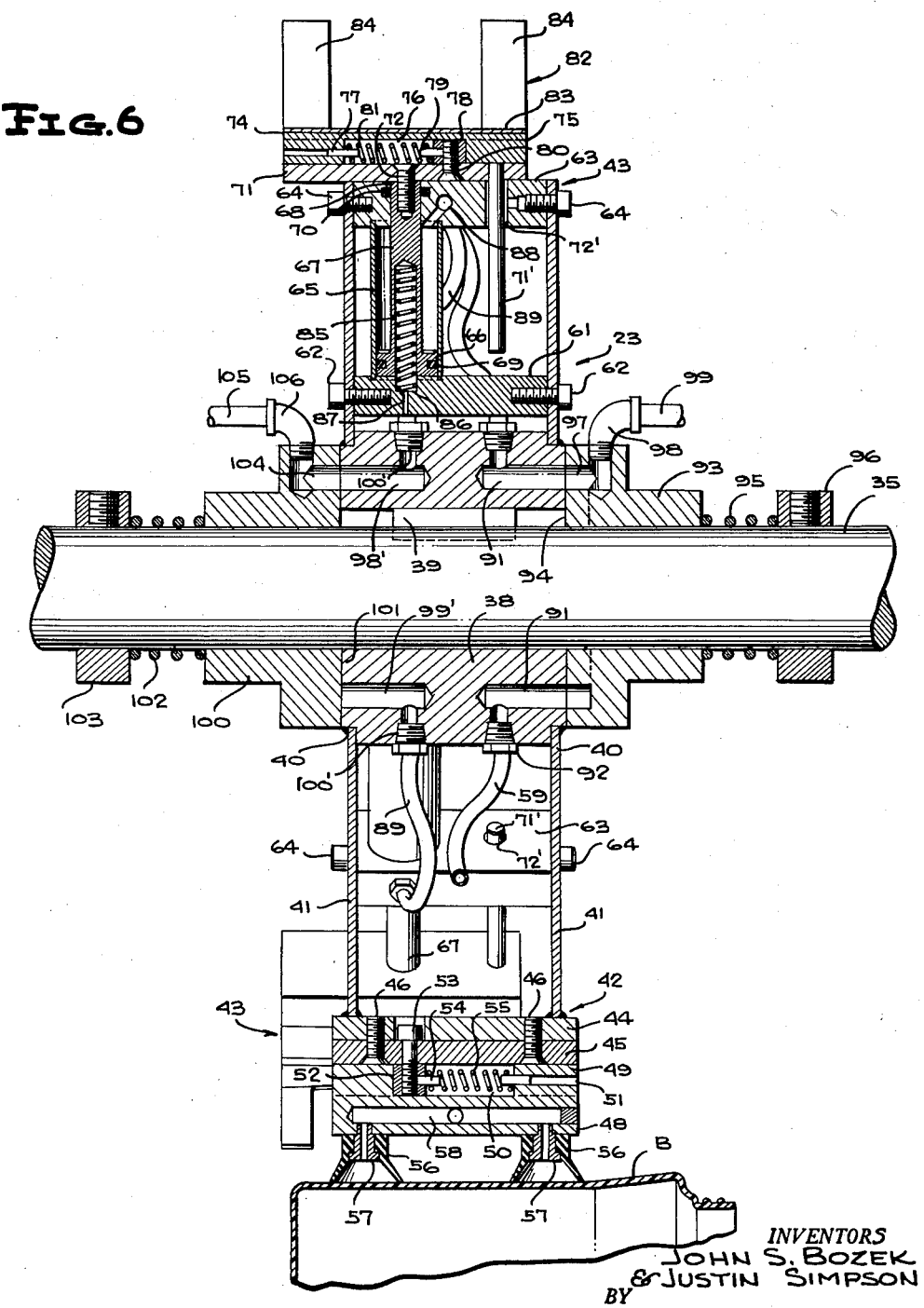

March 10, 1964 — J. S. BOZEK ETAL — 3,124,065
METHOD AND MACHINE FOR PRINTING PLASTIC BOTTLES
Filed Aug. 8, 1960 — 10 Sheets-Sheet 6
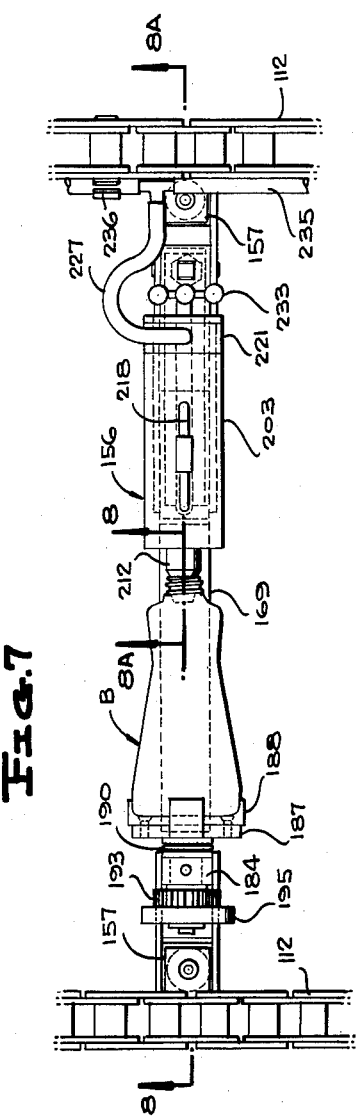
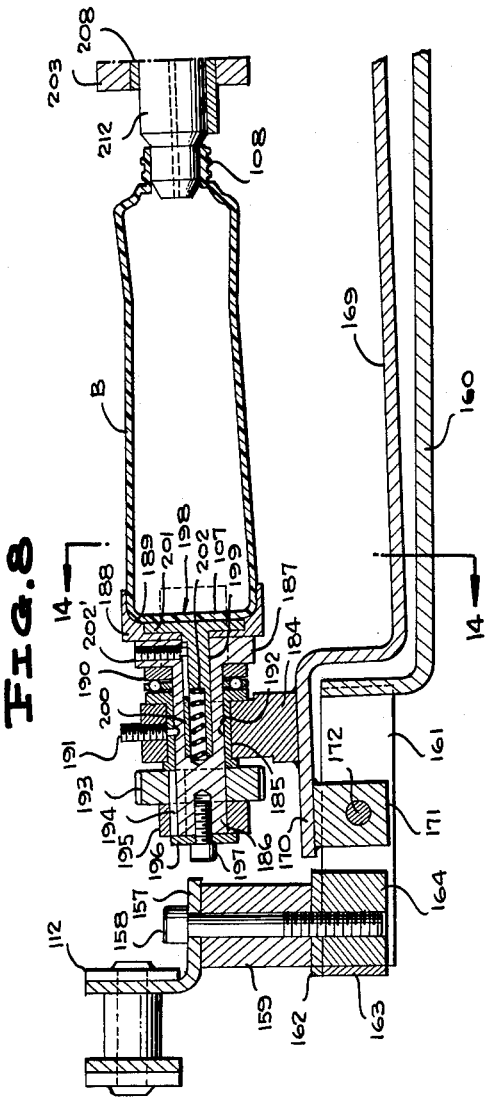
INVENTORS
JOHN S. BOZEK
& JUSTIN SIMPSON
BY
Mason, Porter, Diller & Stewart
ATTORNEYS March 10, 1964 J. S. BOZEK ETAL 3,124,065
METHOD AND MACHINE FOR PRINTING PLASTIC BOTTLES
Filed Aug. 8, 1960 10 Sheets-Sheet 7
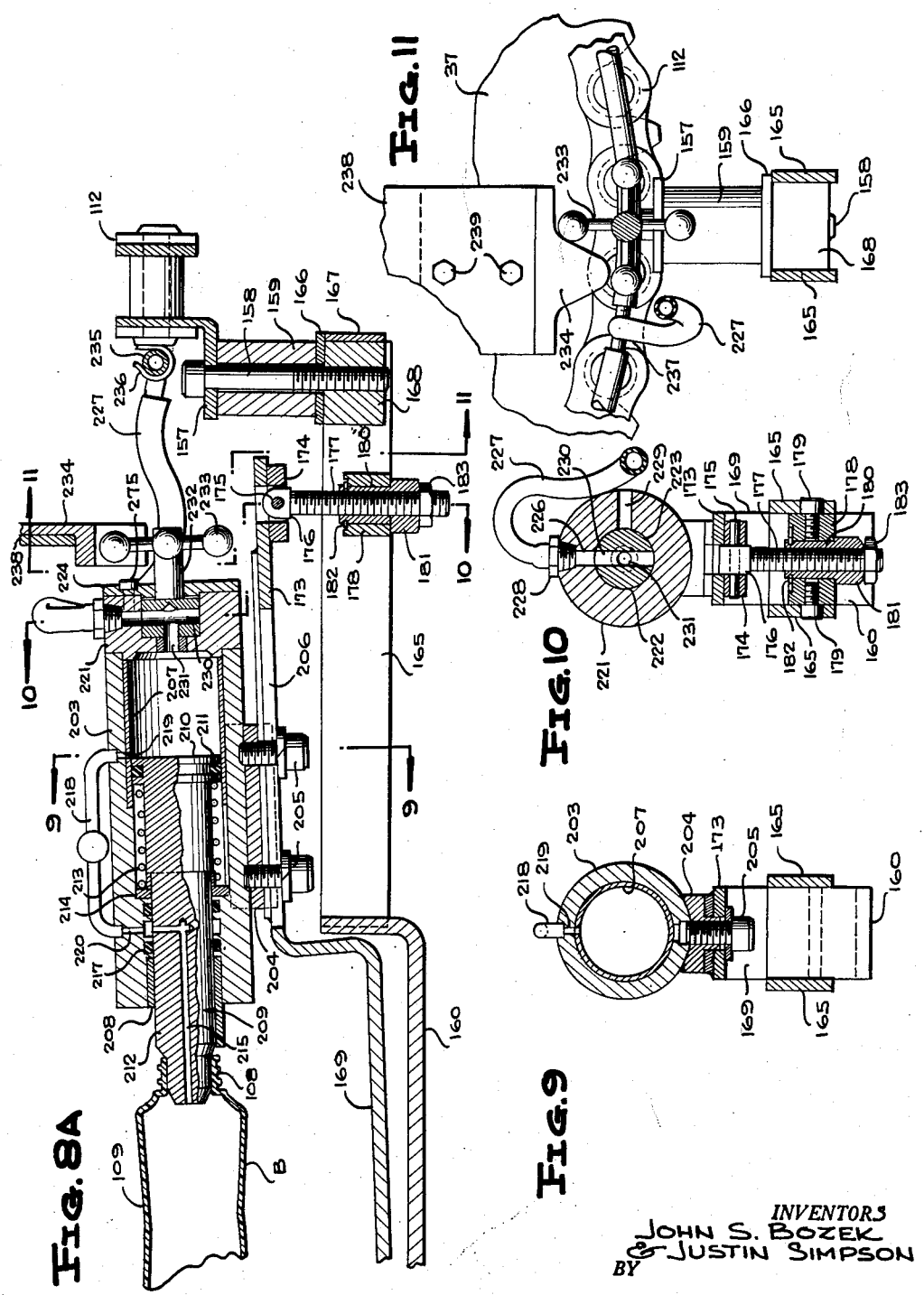
INVENTORS
JOHN S. BOZEK
& JUSTIN SIMPSON
BY
Mason, Porter, Diller & Stewart
ATTORNEYS March 10, 1964
J. S. BOZEK ETAL
3,124,065
METHOD AND MACHINE FOR PRINTING PLASTIC BOTTLES
Filed Aug. 8, 1960
10 Sheets-Sheet 8
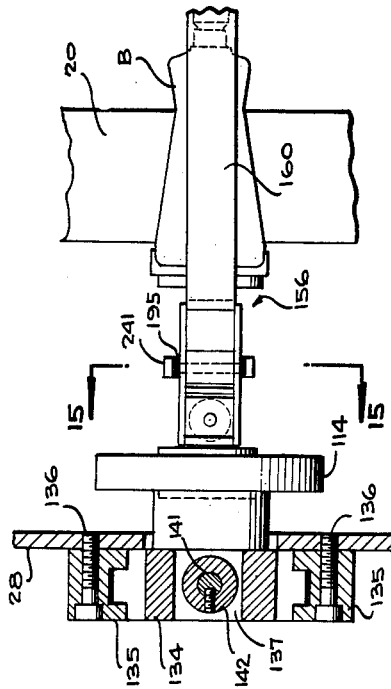
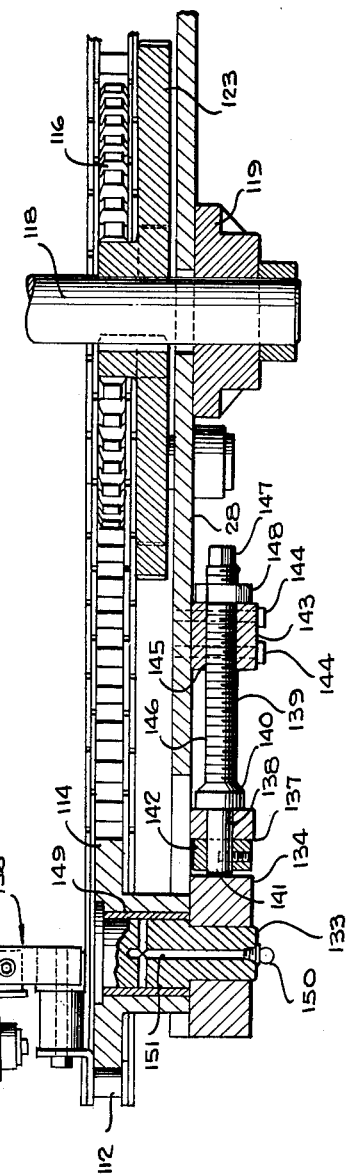
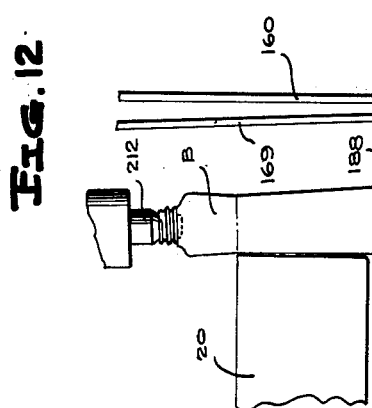
INVENTORS
JOHN S. BOZEK
& JUSTIN SIMPSON
BY
Mason, Porter, Diller & Stewart
ATTORNEYS March 10, 1964  J. S. BOZEK ETAL  3,124,065
METHOD AND MACHINE FOR PRINTING PLASTIC BOTTLES
Filed Aug. 8, 1960  10 Sheets-Sheet 9

INVENTORS
JOHN S. BOZEK
& JUSTIN SIMPSON
BY
Mason, Porter, Diller & Stewart
ATTORNEYS March 10, 1964  J. S. BOZEK ETAL  3,124,065
METHOD AND MACHINE FOR PRINTING PLASTIC BOTTLES
Filed Aug. 8, 1960  10 Sheets-Sheet 10
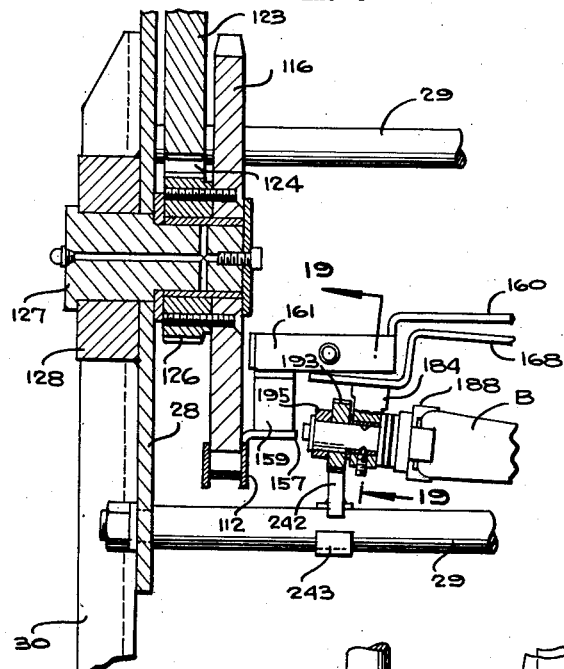
FIG. 17
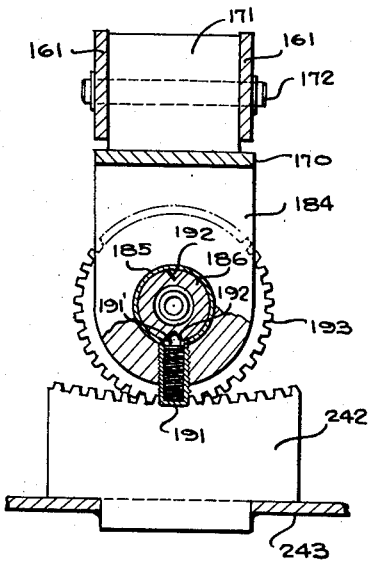
FIG. 19
FIG. 18
INVENTORS
JOHN S. BOZEK
& JUSTIN SIMPSON
BY
Mason, Porter, Diller & Stewart
ATTORNEYS

United States Patent Office 3,124,065
Patented Mar. 10, 1964

3,124,065
METHOD AND MACHINE FOR PRINTING PLASTIC BOTTLES
John S. Bozek, Chicago, and Justin Simpson, Elmhurst, Ill., assignors to Continental Can Company, Inc., New York, N.Y., a corporation of New York
Filed Aug. 8, 1960, Ser. No. 48,306
28 Claims. (Cl. 101—37)

This invention relates in general to new and useful improvements in printing machines for containers, and more specifically relates to a novel printing machine particularly adapted for handling and printing on plastic bottles.

At the present time, there is on the market a plastic bottle which has two relatively wide, oppositely disposed curved faces on which it is desired to print suitable identifying indicia. Since it is desired to print on both of these faces of each bottle, it is necessary that either the bottle be passed through a printing mechanism two times, or there be provided means for first printing on one face of the bottle and then on the other face of the bottle. It is towards the latter that the present invention is directed.

One of the primary objects of the invention is to provide a novel means for handling plastic bottles and to move the same past two spaced printing rolls in a manner to effect the printing on one surface of the bottle by a first of the printing rolls, and then on the opposite surface of the bottle by the second of the printing rolls.

Another object of the invention is to provide a novel apparatus for effecting the movement of a surface of a plastic bottle about the axis of curvature of the surface of the plastic bottle while it is being conveyed and as it passes a printing roll in a manner to effect the printing across the surface of the bottle by the engagement of the bottle with the printing roll.

In order to accomplish the foregoing, there has been devised a bottle conveyor having bottle supports at intervals therealong, the bottle conveyor including support means for effecting the movement of the conveyor and the bottles carried by the supports thereof about an arcuate path adjacent a printing roll, the center of rotation of the arcuate path being coincidental with the center of curvature of the bottle surface which is to contact the printing roll, whereby as the bottle passes along the arcuate path, its surface is wiped across the printing roll and the desired printing on the arcuate surface of the bottle is effected.

Another aspect of the invention is the provision of a support for a bottle which permits the bottle to be accurately positioned when passing a printing roll and at the same time permits the bottle to be rotated intermediate the printing rolls so that one surface of the bottle may be directed towards a first printing roll and an opposite surface thereof directed towards a second printing roll to effect printing on opposite sides of the bottle, the apparatus including a bottle support which is rotatable to permit the desired rotation of the bottle, means adjacent each of the printing rolls to prevent rotation of the support and the bottle carried thereby, and means intermediate the printing rolls to effect the rotation of the bottle support and a bottle carried thereby through approximately 180 degrees.

Another object of the invention is to provide a novel bottle support which may be used in conjunction with plastic bottles, the bottle support both effectively grasping the bottle and serving to pressurize the interior of the bottle to stiffen the surface thereof as required to effect printing on the surface, the bottle support including a socket for receiving the bottom of the bottle and a plunger engageable in the neck of the bottle, the plunger being forced into the bottle under air pressure and forming part of a valve whereby once the plunger has moved a sufficient distance to enter into the neck of a bottle, the air pressure is directed through the plunger into the bottle to effect the internal pressurizing of the bottle.

Still another object of the invention is to provide a suitable bottle support for supporting bottles during a printing operation, the bottle support including a first mounting bracket secured to a conveyor and a second mounting bracket pivotally connected to the first mounting bracket, bottle engaging means carried by the second mounting bracket, and means adjustably positioning the second mounting bracket with respect to the first mounting bracket to vary the angle of inclination of the bottle carried by the bottle support means with respect to the axis of the first mounting bracket, whereby bottles having surfaces disposed in angular relation to their axes may have the surfaces disposed parallel to a printing roll at the time printing thereon takes place.

A further object of the invention is to provide a novel bottle handling system for use with a printing mechanism or similar mechanism operating on a bottle, the bottle handling system including a bottle supply, a turret and a conveyor, the turret having first means thereon for receiving bottles from the bottle supply and delivering the bottles to the conveyor, and second means on the turret for receiving the bottles from the conveyor after the desired operation has been performed thereon.

Yet another object of the invention is to provide a novel bottle handling system which includes a gravity type bottle supply, a turret disposed below the bottle supply and having suction heads at alternating stations for engaging bottles and removing the same from the bottle supply, a conveyor disposed adjacent to the turret and having stations for receiving the bottles from the turret, others of the stations of the turret having means thereon for engaging bottles and receiving the bottles from the conveyor after the conveyor has delivered the bottles through a suitable mechanism, such as a printing mechanism, and there being further bottle pick-up means for receiving the worked upon bottles from the turret and delivering such bottles to a suitable discharge station.

A still further object of the invention is to provide a novel bottle handling system which includes a turret and a conveyor, the turret having alternating stations for delivering bottles to the conveyor and receiving bottles from the conveyor, the conveyor having stations incorporating bottle support means of the type which requires shifting of a bottle when the bottle is being engaged and disengaged, and the turret having shiftable bottle supports which are resiliently restrained against movement, but which are moved with the bottles as the bottles are engaged and disengaged with respect to the bottle supports of the conveyor.

Another object of the invention is to provide a novel turret for receiving bottles from a fixed bottle supply and delivering the bottles to a conveyor, the turret including at least one suction head at each of the bottle supplying stations, the suction head having an axis disposed in angular relation to a radial line extending through the center of its support, and the axis of the suction head leading the radial line so as to effect the engagement of the suction head with a curved surface of a bottle.

With the above, and other objects in view that will hereinafter appear, the nature of the invention will be more clearly understood by reference to the following detailed description, the appended claims, and the several views illustrated in the accompanying drawings.

In the drawings:

FIGURE 6 is an enlarged fragmentary sectional view, taken along the line 6—6 of FIGURE 4, and shows the specific construction of the turret of FIGURE 4 and the specific details of mounting of the bottle supports carried thereby as well as the valve means for controlling the actuation of the bottle supports.

FIGURE 7 is an enlarged fragmentary sectional view, taken along the line 7—7 of FIGURE 4, and shows generally the details of one of the bottle supports of the conveyor.

FIGURE 8 is an enlarged fragmentary sectional view, taken along the line 8—8 of FIGURE 7, and shows the specific details of one end of the bottle support of FIGURE 7.

FIGURE 8A is an enlarged sectional view taken along the line 8A—8A of FIGURE 7, and shows the specific details of the other end of the bottle support of FIGURE 7.

FIGURE 9 is an enlarged fragmentary vertical sectional view taken along the line 9—9 of FIGURE 8A, and shows further the details of the bottle support.

FIGURE 10 is an enlarged fragmentary vertical sectional view taken along the line 10—10 of FIGURE 8A, and shows the specific details of the control valve for operating the bottle support, as well as the means for adjusting the angular relationship of the bottle support with respect to the axis of the conveyor.

FIGURE 11 is an enlarged fragmentary vertical sectional view, taken along the line 11—11 of FIGURE 8A, and shows the specific details of the means for actuating the valve of the bottle support and the manner in which the air hose connected to the bottle support is carried by one of the conveyor chains.

FIGURE 12 is an enlarged fragmentary horizontal sectional view taken along the line 12—12 of FIGURE 2, and shows the specific details of the adjustable mounting of one of the supports for the conveyor.

FIGURE 13 is an enlarged fragmentary sectional view, taken along the line 13—13 of FIGURE 2, and shows further the details of the adjustable mounting of the support for the conveyor.

FIGURE 17 is an enlarged fragmentary vertical sectional view, taken along the line 17—17 of FIGURE 2, and shows the specific details of the means for rotating each bottle support and the bottle carried thereby intermediate the two printing drums whereby printing on opposite surfaces of the bottle may be effected.

FIGURE 18 is an enlarged fragmentary horizontal sectional view, taken along the line 18—18 of FIGURE 2, and shows further the details of the means for effecting the rotation of the bottle supports of the conveyor and the bottles carried thereby.

FIGURE 19 is an enlarged fragmentary vertical sectional view, taken along the line 19—19 of FIGURE 17, and shows the rotation effecting gear of one of the bottle supports engaged with the fixed gear which effects the rotation of the bottle support of the conveyor and a bottle carried thereby as the bottle support passes the fixed gear.

Figure 1:
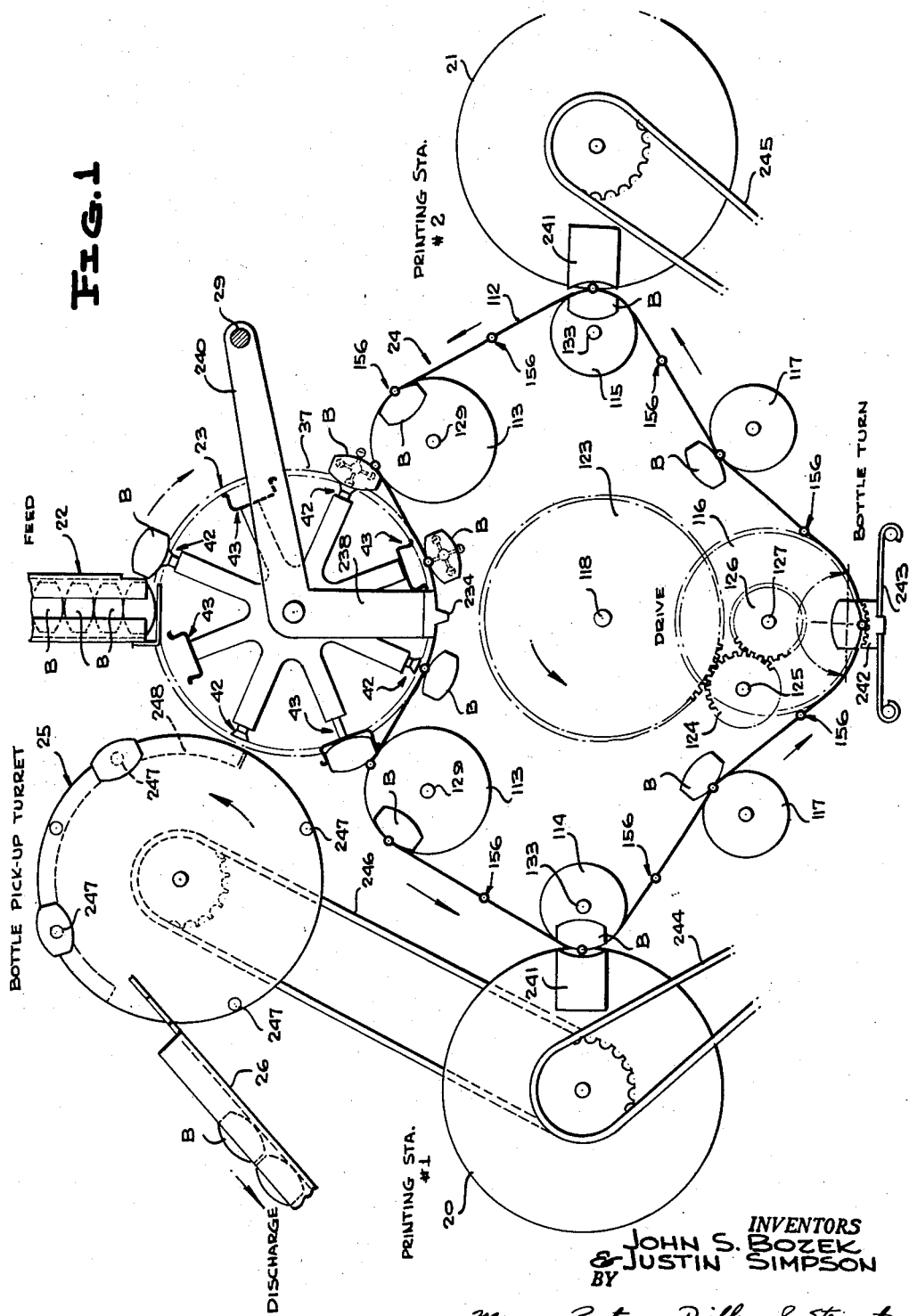
FIGURE 1 is a schematic view showing the general arrangement of the various components of the invention.

With reference to the invention, as illustrated in the drawings, attention is first directed to FIGURE 1 of the drawings, wherein it is shown that there are provided two printing drums 20, 21, which are disposed in widely spaced relation. It is the intention of this invention to pass bottles B first past the printing drum 20 so as to have printing effected on one surface thereof, and then past the printing drum 21 to effect printing on the opposite surface thereof. Towards this end, there is provided a feed chute, generally referred to by the numeral 22, which provides a constant supply of the bottles B. A turret, generally referred to by the numeral 23, is provided for taking the lowermost bottle B from the feed chute 22. The turret 23 delivers the bottles B to an endless conveyor, generally referred to by the numeral 24, which conveyor moves the bottles B first past the printing drum 20 and then past the printing drum 21. The printed bottles B are again received by the turret 23 and are delivered to a bottle pick-up device 25 which in turn, delivers the bottles B to a discharge chute 26.

The entire mechanism, with the exception of the feed chute 22, is carried by a supporting frame, generally referred to by the numeral 27. The supporting frame 27 includes a pair of spaced end plates 28 which are secured together by means of suitable spacer bolts 29 distributed around the periphery of the end plates. The end plates 28 are also supported by means of suitable standards 30 which are secured thereto in the manner best illustrated in FIGURE 2. For purposes of illustration, there are shown supports 31 which extend upwardly and outwardly from the standards 30 and serve to support the printing drums 20, 21. However, in practice, the printing drums 20, 21 will normally be parts of separate self-sustaining machines. The end plates 28 are also provided with upstanding extensions 32 which serve to support the bottle pick-up device 25.

*Feed Chute*

The feed chute 22 may be of any suitable type which will continuously present a bottle, such as the bottle B, in position to be picked off by the turret 23. As illustrated, the feed chute 22 includes a vertical chute structure 33 through which the bottles B are free to fall. The movement of the bottles out of the lower end of the chute structure 33 is resisted by bottle supporters 34 mounted at the bottom of the chute structure 33 in underlying relation to the stack of bottles. These supporters are maintained apart so as to permit the vacuum cups to engage the bottle and pull it out of the chute.

*Combination Bottle Supplying and Bottle Take-Away Turret*

The turret 23 is a combination bottle supplying and bottle take-away turret in that it is provided with means for supplying bottles to the conveyor 24 and for removing bottles from the conveyor 24.

The turret 23 includes a shaft 35 which is suitably journaled for rotation in bearings 36 carried by the upper portions of the end plates 28. The shaft 35 is driven by sprockets 37 which are secured to the shaft 35 within the plates 28 and which are driven by the conveyor 24 in a manner to be described in detail hereinafter.

Figure 4:
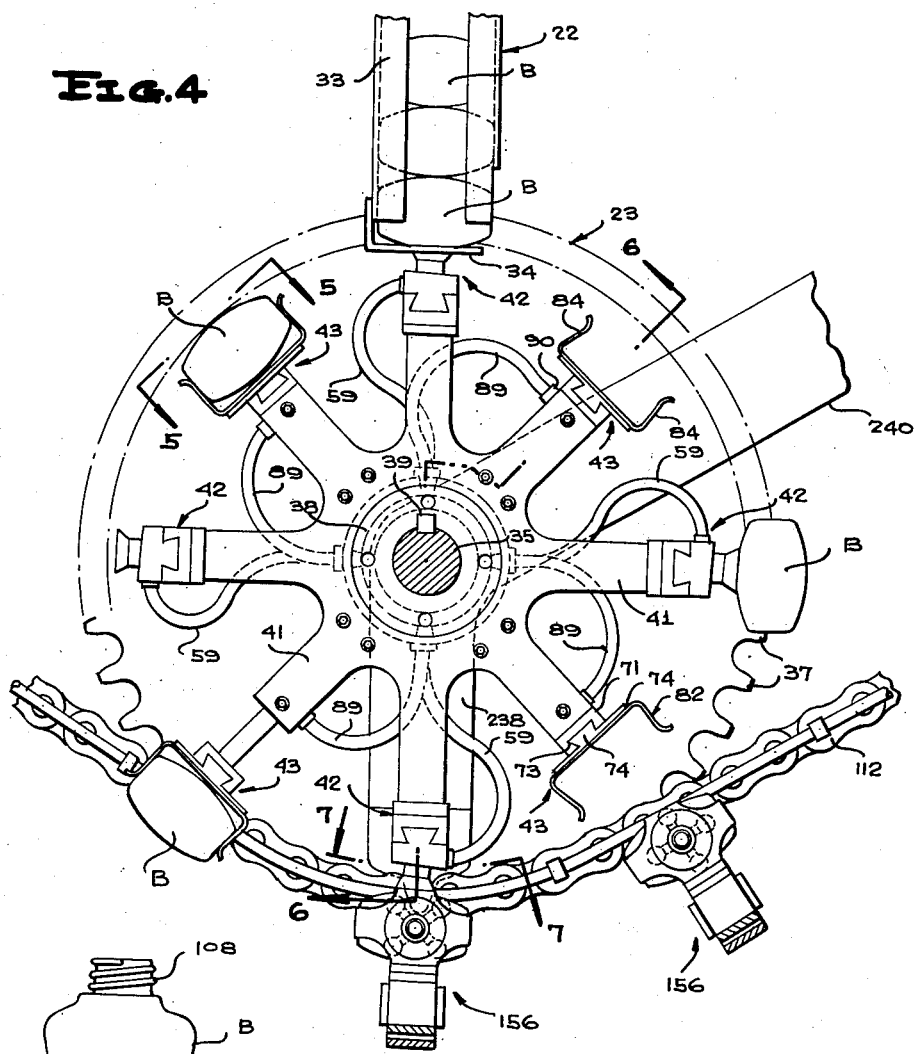
FIGURE 4 is a fragmentary vertical sectional view, taken along the line 4—4 of FIGURE 3, and shows the specific construction of the combination bottle supplying and bottle take-away turret and the relationship thereof with respect to a bottle supply chute and the conveyor which delivers the bottle to the printing rolls or drums.

As is best shown in FIGURES 4 and 6, the turret 23 includes a hub 38 which is secured to the shaft 35 by means of a key 39. A pair of plates 40 are secured to opposite sides of the hub 38 and each of the plates defines a plurality of radiating spoke forming members 41. The spoke forming members 41 of the two plates 40 are aligned with a pair of the spoke forming members 41 defining each spoke. The plates 40 are suitably secured to the hub 38 in any desired manner.

The number of spokes of the turret 23 is an even number, and one set of spokes carries first bottle supports, generally referred to by the numeral 42, and the other set of spokes carries second bottle supports, generally referred to by the numeral 43, the bottle supports 42 and 43 being alternated. The first bottle supports 42 are intended to receive bottles from the feed chute 22 and deliver the bottles to the conveyor, while the second bottle supports 43 are intended to receive bottles from the conveyor 24 and deliver the bottles to the bottle pick-up turret 25.

Figure 14:
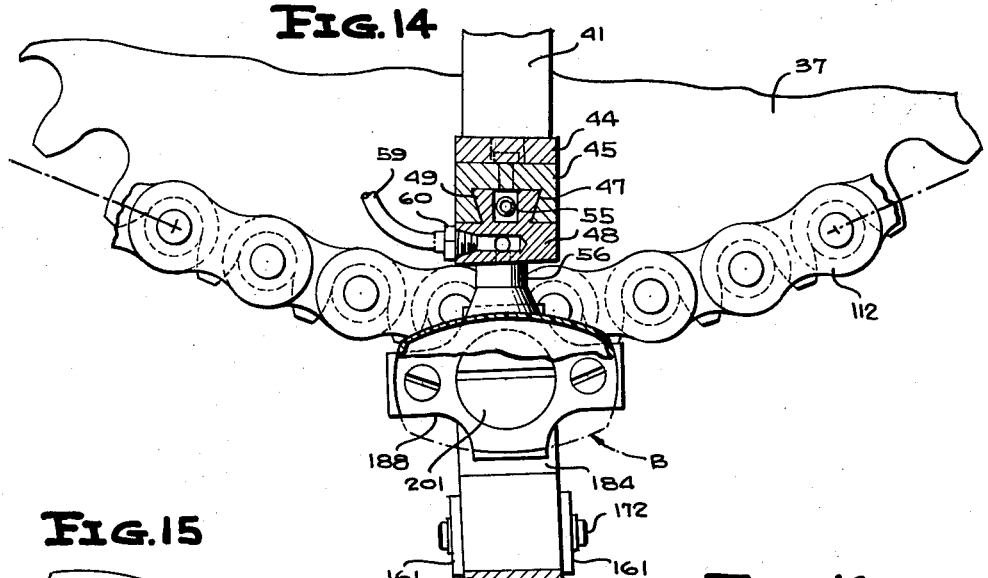
FIGURE 14 is an enlarged fragmentary vertical sectional view, taken along the line 14—14 of FIGURE 8, and shows further the relationship of the bottle and bottle support at the time the bottle is being delivered to the bottle support of the conveyor by the turret.
Figure 15:
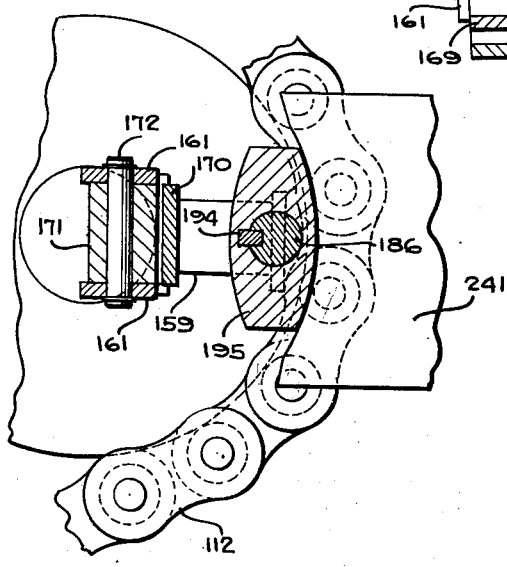
FIGURE 15 is an enlarged fragmentary vertical sectional view taken along the line 15—15 of FIGURE 13, and shows the details of the fixed cam and the follower on the bottle support for preventing rotation of the bottle support as the bottle is engaged with the printing drum during a printing operation.
Figure 16:
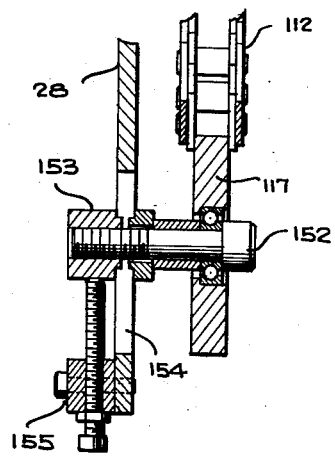
FIGURE 16 is an enlarged fragmentary sectional view, taken along the line 16—16 of FIGURE 2, and shows the details of means for adjustably mounting one of the take-up sprockets for the conveyor chains.

As is best shown in FIGURES 6 and 14, each of the first bottle supports 42 includes a bar 44 which is secured, as by welding, to the outer ends of a respective pair of the spoke forming members 41. A block 45 is secured to the outer surface of the bar 44 by means of screws 46. The block 45 has a dove-tail slot 47 formed in the outer portion thereof, the slot 47 extending axially of the turret in parallel relation to the axis of the shaft 35 and opening through the opposite ends of the block 45. A second block 48 is slidably carried by the block 45 and has a dove-tail projection 49 received in the dove-tail slot 47. Thus, movement of the block 48 relative to the block 45 is limited to axial movement.

The dove-tail projection 49 has a centrally located cutout 50. A pin 51 projects into the right end of the cutout 50 from the dove-tail projection 49, as viewed in FIGURE 6. A stop block 52 projects into the cutout 50 remote from the pin 51. The stop block 52 is carried by a bolt 53 which is supported by the block 45. The stop block 52 carries a pin 54 which opposes the pin 51. A coil spring 55 is engaged over the pins 51 and 54 and normally urges the block 48 to the right, as viewed in FIGURE 6, although resiliently permitting the movement thereof to the left. The stop block 52 limits movement of the block 48 to the right and thus normally retains the block 48 in alignment with the block 45.

A pair of suction heads 56 are secured to the block 48 in depending relation. Each suction head 56 is secured to its respective block 48 by means of a tubular fastener 57 which has its inner end opening into a suction passage 58 formed in the block 48. A suction line 59 is connected to the block 48 by means of a fitting 60 in communication with the suction passage 58. The connection of the other end of the suction line 59 will be described in detail hereinafter.

Each of the second bottle supports 43 includes an inner block 61 which extends between a respective pair of the spoke forming members 41 and is secured thereto by pairs of bolts 62. An outer block 63 is disposed between the outer ends of the respective pair of spoke forming members 41 and is secured thereto by means of bolts 64. An offcenter cylinder 65 extends between the blocks 61 and 63 and is clamped therebetween. A piston 66 is disposed within the cylinder 65 for reciprocation. The piston 66 is integrally connected to a piston rod 67 which projects through an opening 68 in the block 63. The piston 66 is sealed to the walls of the cylinder 65 by a sealing ring 69 and the piston rod 67 is sealed to the walls of the opening 68 by a sealing ring 70.

A block 71 is secured to the outer end of the piston rod 67 by means of a screw 72. The block 71 is guided by a pin 71' which is guidedly disposed in a bore 72' through the block 63. The block 71 has a dove-tail slot 73 formed therein and extending the full length thereof. The dove-tail slot is best illustrated in FIGURE 4, and opens through the outer face of the block 71. A mounting plate 74 is provided with a dove-tail extension 75 which is seated in the dove-tail slot to permit limited movement of the mounting plate 74 with respect to the block 71.

The dove-tail extension 75 is provided with a centrally located cutout 76, as is best shown in FIGURE 6. A pin 77 projects into the left end of the cutout 76 from the dove-tail extension 75. A stop block 78 is disposed in the right end of the cutout 76 and has a pin 79 opposing the pin 77. The stop block 78 is held in place by means of a screw 80 carried by the block 71. A spring 81 is engaged over the pins 77, 79 and urges the mounting plate 74 to the left to a position aligned with the block 71, but permitting movement of the mounting plate 74 to the right out of alignment with the block 71.

A cradle type bottle holder, generally referred to by the numeral 82, is secured to the outer surface of the mounting plate 74. The bottle holder 82 includes a centrally located plate 83 which overlies and is suitably secured to the mounting plate 74. Pairs of resilient fingers 84 project outwardly from opposite ends of the plate 83, the outline of the fingers 84 being best illustrated in FIGURE 4.

The piston 66 and the piston rod 67 are tubular, and a spring 85 is positioned therein for urging the piston 66 and the piston rod 67 outwardly of the cylinder 65. The inner end of the spring 85 is seated in a seat 86 formed in the outer surface of the block 61. A small bore 87 also opens through the seat 86 and through the inner surface of the block 61 to vent the lower end of the cylinder 65.

The block 63 has a compressed air passage 88 which opens into the upper end of the cylinder 65. Compressed air is supplied to the compressed air passage 88 by means of a compressed air line 89 which is secured to the block 63 by means of a fitting 90, as is best shown in FIGURE 4. The spring 85 normally urges the piston out of the cylinder 65 whereas the compressed air acting upon the piston 66 retains the piston 66 in its retracted position. The details of the connection of the other end of the compressed air line 89 will be set forth hereinafter.

The hub 38 has a suction passage 91 for each of the suction lines 59. Each of the suction passages 91, as is best illustrated in FIGURE 6, is of a right angular configuration and has one end thereof opening radially out through the hub 38 and the other end thereof opening axially out through the hub 38. A fitting 92 connects each of the suction lines 59 to its respective one of the suction passages 91.

A block 93 is slidably mounted on the shaft 35 and is fixed against rotation therewith. The block 93 has a face 94 which opposes the right end of the hub 38 and forms a seal therewith. The face 94 is forced into engagement with the hub face by a spring 95 which is carried by the shaft 35 and which is backed up by a collar 96 adjustably secured to the shaft 35 for rotation therewith.

The block 93 is provided with a suction passage 97 which is annular in extent, but extends only partially around the block 93. A fitting 98 connects a suction line 99 to the block 93 in communication with the suction passage 97 therein. It is to be understood that the block 93, the fitting 98 and the suction line 99 remain stationary although the shaft 35 and the hub 38 rotate.

It is intended that the suction heads 56 be actuated only from a point slightly in advance of the feed chute 22 to a point substantially at the bottom of the turret 23, at which point the bottles B are released from the suction heads 56. Accordingly, the suction passage 97 is of this annular extent.

The hub 38 also has an air passage 99' for each air line 89, which air passage opens out of the left side of the hub and also radially outwardly of the hub. A fitting 100' connects each air line 89 to its respective air passage 99'.

A block 100 which corresponds to the block 93 is disposed on the left side of the hub 38. The block 100 has a face 101 which is engaged with the left face of the hub 38 and forms a seal therewith. The block 100 is urged towards the hub 38 by means of a spring 102 which is carried by the shaft 35 and has one end engaging the block 100 and the opposite end engaging a collar 103 which is adjustably carried by the shaft 35.

The block 100 has an air passage 104 formed therein and opening through the face 101, the air passage 104 being annular in configuration and generally semicircular in extent. An air line 105 whose opposite end (not shown) is connected to a pressurized air source is connected to the block 101 in communication with the air passage 104 by means of a fitting 106. It is to be understood that the block 100, the air line 105 and the fitting 106 remain stationary.

Compressed air introduced into the cylinder 65 retains the bottle holder 82 in a retracted position so that it may pass the bottles carried by the feed chute 22. The bottle holder 82 remains retracted until it is aligned with a bottle carried by the conveyor 24, at which time the air pressure is relieved and the bottle holder 82 is projected. The bottle holder 82 remains projected until a bottle B carried thereby is engaged by the bottle pick-up turret 25. At this time, it is retracted by the introduction of air pressure. Therefore, the air passage 104 has an extent from the point where a bottle is discharged into the bottle pick-up turret 25 and the point where the bottle holder 82 is aligned with a bottle carried by the conveyor 24.

Figure 5:
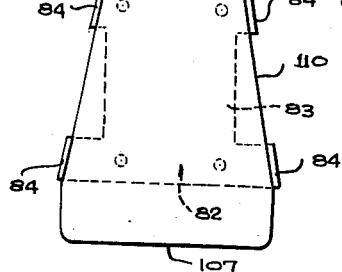
FIGURE 5 is an enlarged fragmentary view, taken generally along the line 5—5 of FIGURE 4, and shows the specific relationship of one of the bottle supports with respect to a bottle.

Reference is now made to FIGURE 5 in particular, wherein it is shown that the bottle B includes a base 107, a neck 108 and a body portion 109. The body portion 109 is of the necked-down type, and thus defines a lower tapered portion 110 and an upper flaring portion 111. It is to be noted that one set of the fingers 84 are relatively widely spaced, whereas the other set of the fingers 84 are more closely spaced to fit the shape of the bottle B; the arrangement of the fingers 84 being varied as required to fit different bottles. The fingers 84 will snap over the bottle B, at which time it is firmly engaged within the bottle holder 82 and clamped by the two sets of fingers 84. When the bottle is disposed within the bottle holder 82, the bottle is spaced from the plate 83 of the bottle holder 82 to prevent smearing of wet ink on the bottle.

*Conveyor Construction*

The conveyor 24 includes a pair of spaced conveyor chains 112 which are identical and which travel about a path best illustarted in FIGURE 1. Each of the conveyor chains 112 is endless, and the upper run thereof passes beneath and is engaged with an associated one of the sprockets 37. Thus, the turret 23 is driven by the conveyor chains 112.

Each conveyor chain 112 passes over a pair of upper sprockets 113 which are disposed outwardly of the sprockets 37 at elevations requiring the conveyor chains 112 to pass upwardly and thereover after passing away from the sprockets 37. Each conveyor chain 112 also passes around a pair of outermost disks 114, 115 and around a lower drive sprocket 116. A pair of slack take-up sprockets 117 are disposed intermediate the drive sprocket 116 and the disks 114, 115.

Figure 3:
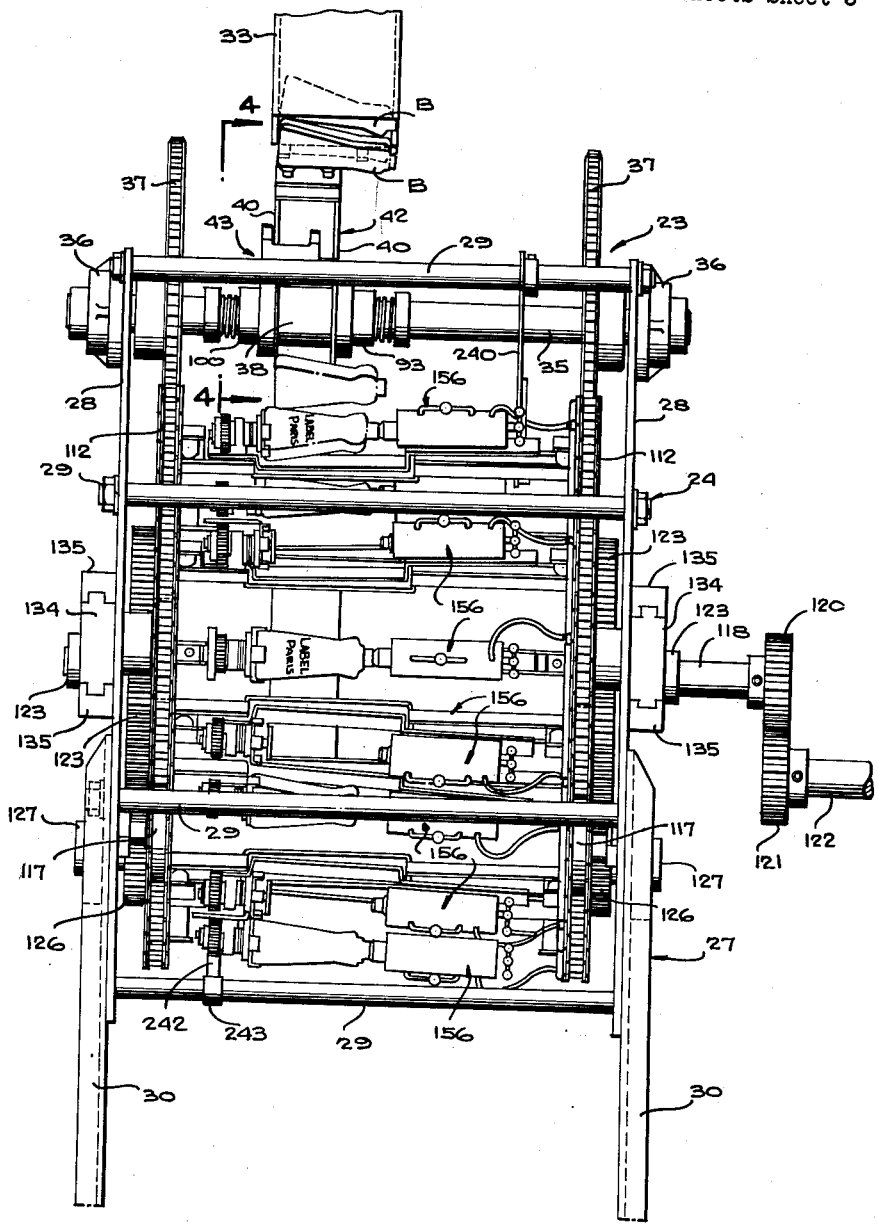
FIGURE 3 is an end view of the invention, taken along the line 3—3 of FIGURE 2, and shows further the details of the means for handling the bottles.

The drive for the conveyor chains 112 includes a main shaft 118 which is suitably journaled in a pair of bearings 119 carried by the end plates 28. One end of the shaft 118 projects beyond its respective bearings, as is shown in FIGURE 3, and is provided with a drive gear 120. The drive gear 120 is meshed with a gear 121 which is carried by a drive shaft 122 so that power may be transmitted to the shaft 118 from the drive shaft 122. The drive shaft 122 may be driven in any desired manner (not shown).

The shaft 118 carries a pair of gears 123 which are meshed with gear 124 carried by idler shafts 125. The gears 124 are, in turn, meshed with gears 126 which are secured to the sprockets 116. The sprockets 116 and the gears 126 are rotatably journaled on stub shafts 127 which are supported by supports 128 carried by the end plates 28.

The sprockets 113 are carried by stub shafts 129 which have their ends mounted in supports 130. Each of the supports 130 is seated in a suitable guideway 131 in its respective one of the end plates 28 for adjustable positioning to properly position the sprockets 113 relative to the sprockets 37. Suitable support positioning and adjusting means 132 are carried by the end plates 28 and engage with the supports 130 to position them in adjusted positions in the guideways 131.

For a reason to be described in detail hereinafter, it is desirable that the disks 114 be replaceable and that the shaft 133 on which they are mounted be adjustable. As is best illustrated in FIGURE 12, each shaft 133 is a stub shaft and is releasably carried by a mounting block 134. Each mounting block 134 is positioned between a pair of guides 135 which are secured to their respective one of the end plates 28 by means of bolts 136. Each mounting block 134 has an opening 137 therein adjacent one end. A bore 138 extends through the one end of the mounting block 134 and into the opening 137. An adjusting screw 139 has one end thereof provided with a shoulder member 140 and terminates in a shaft portion 141. The shoulder portion 140 abuts against the end of the mounting block 134 and the shaft portion 141 extends through the bore 138 into the opening 137. A collar 142 is secured to the shaft portion 141 to retain the shaft portion 141 within the bore 138.

A block 143 is secured to the respective end plate 28 by means of bolts 144. The block 143 has an internally threaded bore 145 which is aligned with the bore 138 and in which a threaded portion 146 of the screw 139 is threaded. The extreme end of the screw 139 is of a non-circular cross-section, as at 147, in order to facilitate the turning of the screw 146 to adjust the position of the mounting block 134. A lock nut 148 is carried by the threaded portion 146 and bears against the block 143 to lock the screw 139 in an adjusted position.

It is to be noted that the stub shaft 133 has a bearing 149 on which the sprocket 114 rotates. The bearing 149 is lubricated by means of a suitable grease fitting 150 which opens into a grease passage 151 in the stub shaft 133.

Referring once again to FIGURE 2 in particular, it will be seen that each of the slack take-up sprockets 117 is mounted on a stub shaft 152. One end of each shaft 152 is mounted in a support 153 adjustably seated in a guideway 154 formed in the end plate 28. Suitable adjusting and positioning means 155 are carried by the end plates 28 and connected to the supports 153 to adjustably position the shafts 152 and the sprockets 117 carried thereby.

*Conveyor Bottle Holder*

The conveyor 24 includes a plurality of spaced bottle holders, each generally referred to by the numeral 156, which are supported by the conveyor chains 112. The conveyor bottle holders 156 extend between the conveyor chains 112 and the number of bottle holders 156 is odd for a reason to be described in detail hereinafter.

As is best shown in FIGURE 7, at spaced intervals, the conveyor chains 112 are provided with mounting ears 157 which are disposed in opposed aligned relation. A bolt 158 extends down through which each of the ears 157 and has a spacer block 159 disposed thereon and clamped against the underside of the respective ear 157. The bolts 158 support a fixed, generally U-shaped mounting bracket 160. One end of the mounting bracket 160 has a pair of spaced apart bars 161 extending outwardly therefrom. The extreme ends of the bars 161 are connected together by a horizontal member 162 and an upstanding member 163. The horizontal member 162 is received over the bolts 158 and a nut member 164 is seated within the area defined by the horizontal member 162, the upstanding member 163 and the bars 161. The nut 164 is threaded on the bolt 158 and serves to secure the bars 161 to the ear 157 in the desired spaced relation with respect to the run of the conveyor chain 112.

The mounting for the right end of the mounting bracket 160 is illustrated in FIGURE 8A. A pair of elongated bars 165 is secured to and extend from the right end of the mounting bracket 160 in parallel relation. The ends of the bars 165 remote from the mounting bracket 160 are connected together by a horizontal member 166 and an upstanding member 167. The horizontal member 166 has the bolt 158 passed therethrough and a nut member 168 is threaded on the lower end of the bolt 158. The nut member 168 is seated within the space generally defined by the horizontal member 166, the upstanding member 167, and the bars 165. In this manner, the right end of the mounting bracket 160 is rigidly connected to the right conveyor chain 112.

A second generally U-shaped mounting bracket 169 is generally nested within the mounting bracket 160. The end of the mounting bracket 169 adjacent the bars 161 is provided with a relatively short extension 170 which generally overlies the bars 161 and which has a block 171 secured to the underside thereof in depending relation, as viewed in FIGURE 8. The block 171 is disposed between the bars 161 and is connected thereto for pivotal movement by means of a pivot pin 172.

The mounting for the opposite end of the mounting bracket 169 is best illustrated in FIGURE 8A. The mounting bracket 169 has a relatively long extension 173 which overlies the bars 165. A plate 174 is secured to the underside of the long extension 173 adjacent the terminal end thereof. The plate 174 carries a pivot pin 175 on which a head 176 of the bolt 177 is pivotally mounted. The bolt 177 extends down between the bars 165. A block 178 is positioned between the bars 165 and is secured in place by means of cap screws 179. The cap screws 179 also function as trunnions for the block 178 to permit pivoting thereof.

The block 178 is provided with a bore 180 therethrough in which there is seated a reduced upper portion of a nut member 181. The nut member 181 is freely rotatable within the block 178 and is threaded on the bolt 177. The nut member 181 is retained in the block 178 by means of a locking ring 182. The bolt 177 is also provided with a lock nut 183 which bears against the underside of the nut member 181.

Reference is again made to FIGURE 8 of the drawings, wherein it is to be seen that the short extension 170 of the mounting bracket 169 has a mounting block 184 secured thereto. A bearing 185 is carried by the mounting block 184 in generally parallel relation to the mounting bracket 169. An elongated shaft 186 is rotatably journaled within the bearing 185 and projects through opposite sides thereof. The shaft 186 terminates at the right end thereof in an enlarged mounting flange 187 to which a bottle base receiving member 188 is secured, the bottle base receiving member 188 defining a socket 189 in which the base portion of one of the bottles D may be seated. A thrust bearing 190 is carried by the shaft 186 intermediate the mounting flange 187 and the mounting block 184. The shaft 186 is releasably retained against rotation relative to the bearing block 184 in a last placed position by a spring loaded detent assembly 191 which has a detent 191' seated in one of two recesses 192 formed in the periphery of the shaft 186, as is best shown in FIGURE 19.

A gear 193 is keyed on the left end portion of the shaft 186 by means of a key 194. The same key 194 keys a cam follower 195 on the left end of the shaft 186. The cam follower 195 and the gear 193 are retained on the shaft 186 by a washer 196 held in place by a bolt 197 threaded into the end of the shaft 186.

The shaft 186 also carries a bottle ejector, generally referred to by the numeral 198. The bottle ejector 198 includes a shaft 199 which is slidably disposed within a bore 200 formed in the shaft 186 and opening through the mounting flange 187, the bore 200 also opening through the bottle base receiving member 188. The right end of the shaft 199 is provided with an enlarged plate 201 which is engageable with a base 107 of a bottle B to eject the bottle B out of the bottle base receiving member 188. A spring 202 is seated in the left end of the shaft 199 and bears against the bottom of the bore 200 to constantly urge the bottle ejector 198 to the right to a bottle ejecting position. The spring 202 is compressed when the bottle B is seated in the socket 198 defined by the bottle base receiving member 188. A retaining screw 202' carried by the mounting flange serves to limit the movement of the shaft 199 within the shaft 186.

Reference is now made to FIGURE 8A, wherein it will be seen that the right end of the bottle holder 156 includes a cylinder 203 which is adjustably secured to the long extension 173 of the mounting bracket 169. The mounting of the cylinder 203 is accomplished by means of a spacer 204 which rests upon the long extension 173 and bolts 205 which pass through an elongated slot 206 in the extension 173. The right end of the cylinder 203 is provided with a bearing type liner 207. The opposite end of the cylinder, that is, the left end of the cylinder 203, is provided with a bearing 208. A plunger assembly, generally referred to by the numeral 209, is slidably and rotatably journaled in the cylinder 203. The plunger assembly 209 includes a piston 210 which is disposed within the portion of the cylinder 203 having the bearing type liner 207. The piston 210 carries a sealing ring 211 which engages the liner 207 to form a seal therewith. The piston 210 is integrally connected to a piston rod 212 which projects out through the left end of the cylinder 203 and is journaled in the bearing 208. The left end of the piston rod 212 is reduced and of a configuration to be received within the neck 108 of the bottle B.

The piston 210, as well as the remainder of the components of the plunger assembly 209, is urged to the right by a spring 213 which bears against the left side of the piston 210. The left end of the spring 213 engages a spring retainer 214 disposed within the cylinder 203.

It is intended that the plunger assembly 209 also serve in the inflation of the bottle B to stiffen the body portion 109 thereof during a printing operation. To this end, the piston rod 212 is provided with an air passage 215 which opens out through the left end thereof. The air passage also opens out through the periphery of the piston rod 212 for alignment with an annular air passage 216 formed in the inner part of the cylinder 203 in alignment with that part of the cylinder 203 receiving the piston rod 212. A pair of sealing rings 217 are disposed on opposite sides of the air passage 216 and form a seal with the piston rod 212 to prevent accidental escape of air along the exterior of the piston rod 212.

An air pipe 218 extends along the right side of the cylinder 203. One end of the air pipe 218 opens into the cylinder 203 through the liner 207 to the right of the piston 210 by means of a port 219. The air pipe 218 is provided with a pressure reducing valve 218' to limit the pressure of air delivered to a bottle to pressurize the bottle. A second port 220 opens into the air passage 216. It is to be noted that the port 219 is open when the air passage 215 is aligned with the air passage 216. At this time, the plunger assembly 209 is firmly seated with respect to the bottle B and forms a seal with the neck 108 thereof to prevent the escape of air which is used to pressurize the interior of the bottle B.

The right end of the cylinder 203 is closed by a valve block 221 which is suitably secured to the cylinder 203 in sealed relation. The valve block 221 has a bore 222 in which a valve member 223 is seated. The valve member 223 is retained in place by a cover plate 224 which is secured to the valve block 221 by means of bolts 225.

The valve block 221 has an air delivery passage 226 which opens into the bore 222. An air supply line 227 is connected to the air delivery passage 226 by means of a fitting 228 which is threaded into the valve block 221. The valve block 221 also includes an exhaust passage 229 which is disposed at right angles to the air delivery passage 226 and which opens into the bore 222.

The valve member 223 has a first air passage 230 disposed at right angles to the axis thereof and a second air passage 231 which intersects the air passage 230. The air passage 231 opens into the right end of the cylinder 203 for delivering air thereto.

The valve member 223 has a valve rod 232 which projects beyond the cover plate 224. An operating member 233 is secured to the valve rod 232. It is to be noted that the operating member 233, as is best illustrated in FIGURE 11, is provided with four arms. As the conveyor 24 operates, the operating member 233 will move past a fixed cam member 234, whose position and structure will be described in more detail hereinafter and the operator 233 will be rotated 90 degrees with the resultant rotation of the valve member 223. As a result, each time the operating member 233 is operated, the valve member 223 will switch between an air supplying position for the cylinder 203 and an air exhausting position for the cylinder 203.

As is best shown in FIGURES 8A and 11, a main air supply line 235 is carried by one of the conveyor chains 112, the main air supply line being supported by clips 236. The main air supply line 235 is provided at spaced intervals with T-fittings 237 to which the air delivery line 227 of each of the bottle holders is connected. The main air supply line 235 will be connected to a suitable compressed air source through a connection (not shown) which may be suitably formed on the drive shaft 118.

Figure 2:
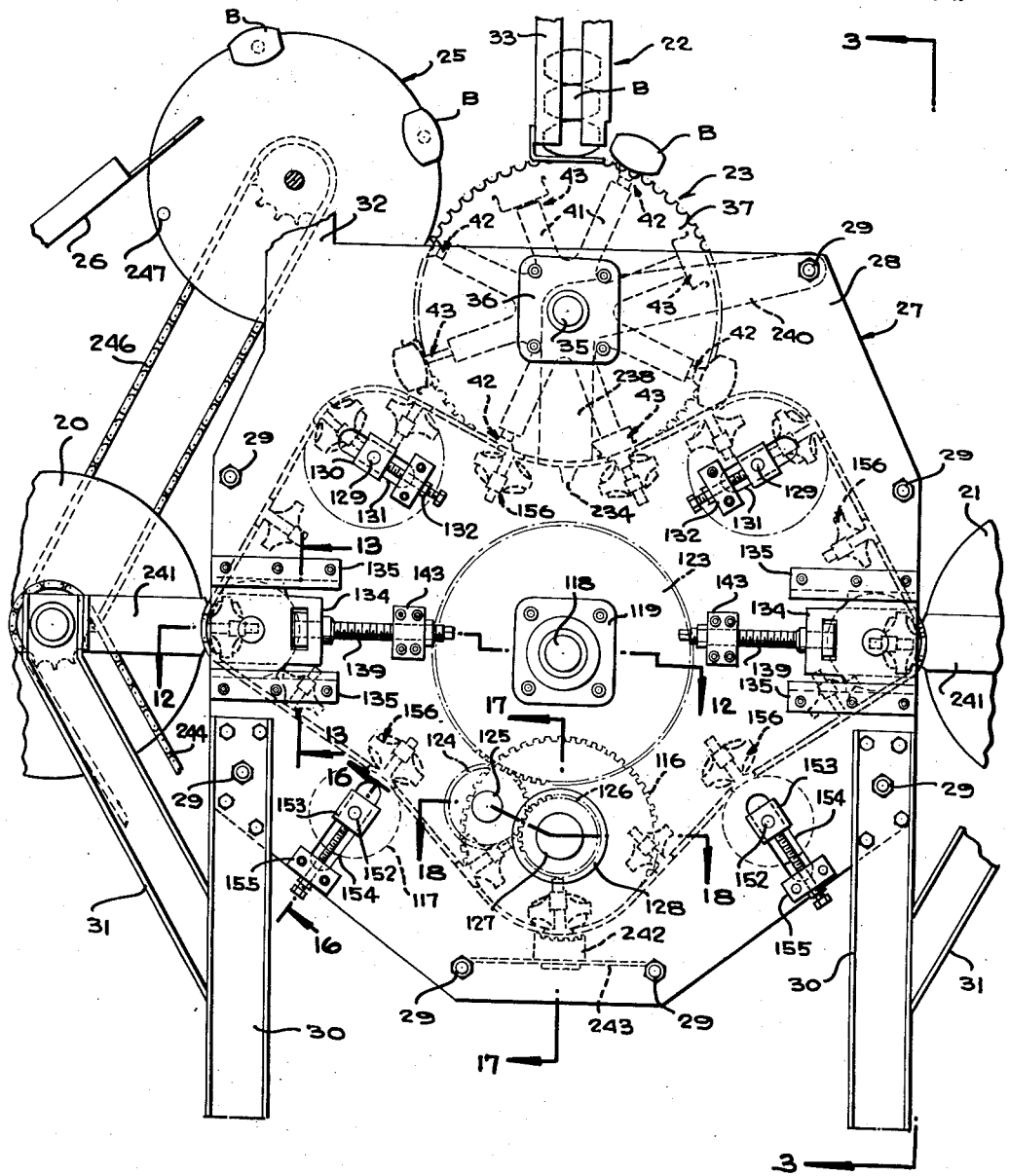
FIGURE 2 is an elevational view of the invention, and shows the general arrangement of the components thereof.

The cam 234 is supported by an arm 238 by means of bolts 239. As is best illustrated in FIGURE 2, the arm 238 is part of a bellcrank type support which includes a second arm 240. The intersection of the arms 238 and 240 occurs at a point where the arms are journaled on the shaft 35. The arm 240 is secured to one of the spacer bolts 29 to prevent movement thereof. The arms 238 and 240 position the cam 234 at the point of transfer of bottles B from the turret 23 to the conveyor 24, and from the conveyor 24 back to the turret 23.

*Printing Operation*

The printing rolls or drums 20, 21 are conventional and will not be described in detail. However, it is to be understood that they may be either of the lithograph type or of the offset type. Since the printing is to take place on a curved surface of a bottle B, it is necessary that this surface be disposed parallel to the axis of the printing roll or drum. The necessary adjustment is accomplished by adjusting the mounting bracket 169 with respect to the mounting bracket 160 in the manner described hereinabove.

It is also necessary that the curved surface of the bottle B on which the printing is to take place move through an arcuate path during the time of the printing operation in order that the printing may take place across the surface thereof. This is accomplished by having the centers of the stub shafts 133 spaced from their associated printing rolls 20, 21 a distance equal to the radius of curvature of the surface of the bottle on which the printing is to take place. Thus, as the bottles B move adjacent the printing rolls 20, 21 and pass around the disks 114, 115, the surfaces on which the printing is to take place moves through arcuate paths as is required for the printing operation. Since the disks 114, 115 are replaceable, and the positions of the shafts 133 adjustable, it will be apparent that the arcuate path may be varied to accommodate a particular arcuate section of bottle. At this time, it is pointed out that disks are used in lieu of sprockets at these places since sprockets are not available in all diameters whereas disks of any diameter may be readily turned.

From the description of the bottle holder 156, it will be apparent that the bottle base receiving member 188, the plunger assembly 209 and the bottle B disposed therebetween are free to rotate although their positions are normally maintained due to the friction of the mounting for the bottle base receiving member 188 and the plunger assembly 209. In order to assure that the bottle B will not rotate when engaged by the printing rolls 20, 21, a cam member 241 is fixed adjacent each of the printing rolls 20, 21 for engagement by the cam follower 195 secured to each of the shafts 186. On the other hand, it is necessary that each bottle B be rotated 180 degrees between the printing roll 20 and the printing roll 21. To this end, there are provided bottle turning means which include a fixed gear or rack 242 which is carried by a suitable support 243 below the areas of the sprockets 116. The details of this are best illustrated in FIGURES 17 and 19. It is to be noted that the support 243 is engaged over two of the lowermost spacer bolts 29.

Since it is desired that each bottle B be rotated 180 degrees from its first printing position to its second printing position, it is necessary that the extent of the gear rack 242 be equal to one-half the circumference of the gear 193 with which it is meshed. This is clearly shown in FIGURE 19. Other types of operators may be provided for rotating the bottle holders 156. These may include a device similar to the operator 233 and two cams similar to the cam 234 to provide the desired 180 degree rotation.

Reference is again made to FIGURE 1, wherein it is shown that the printing rolls 20, 21 are driven by chains 244, 245. These chains are driven from the same source as that used to drive the drive shaft 118 so that the printing rolls 20, 21 turn in timed relation to the movement of the conveyor chains 112. Further, it will be seen that a drive chain 246 drives the bottle pickup device 25 from the printing roll 20.

*Bottle Pickup Turret*

The bottle pickup device 25 may be of any construction and, for example, may be in the form of an endless conveyor or a turret as illustrated. The construction of the device 25 will depend in part on the drying time of the printing ink in that it is necessary that the ink be dry when the bottles B are discharged from the device 25. This may necessitate the use of a long endless conveyor as compared to a short travel length turret. The bottle pickup device 25 will be provided with a plurality of pins or plungers 247 which are receivable within the necks 108 of the bottles B. In order that these pins 247 may be projectable, the pins 247 are resiliently mounted in a manner not shown. In addition, there is provided a cam 248 for acting upon the pins 247 to project them in timed relation to the rotation of the bottle pickup device 25. The pins 247 will be projected by the cam 248 as they come into alignment with the bottles B carried by the turret 23. The engagement of the bottles over the pins 247 will result in a stripping of the bottles from the turret 23 to the device 25. When the bottles B come into general alignment with the discharge chute 26, the pins 247 will be retracted to release the bottles B at which time they will fall onto the discharge chute 26 and be delivered to a desired area.

*Operation*

In the operation of the invention, the turret 23, the conveyor 24, the printing rolls 20, 21 and the device 25 will all be driven in timed relation. As the turret 23 rotates, one of the first bottle supports 42 will pass beneath the feed chute 22 and the suction heads 56 thereof will engage the lowermost bottle B and remove the same from the feed chute. As the turret 23 rotates, the bottle B will be delivered into alignment with one of the bottle holders 156 carried by the conveyor chains 112. As the bottle becomes aligned with the bottle holder, the operating member 233 of the valve for that particular bottle holder will engage the cam member 241 and be turned to a position where air is introduced into the cylinder 203. This results in the movement of the plunger assembly 209 to the left with the result that the end of the piston rod 212 will be received in the neck 108 of the bottle B. Further, the movement of the plunger assembly to the left, as viewed in FIGURE 8A, will result in the movement of the bottle to the left to a position where the base 107 thereof is seated in the bottle base receiving member 188. During the shifting of the bottle, the bottle remains supported by the suction heads 156, with the result that the block 48 shifts therewith against the resistance of the spring 55.

As soon as the bottle is firmly engaged by the bottle holder 156 with which it is associated, the suction to the suction heads 156 is broken and the bottle is released from the turret 23. The conveyor 24 in its continued movement, moves the bottle past the printing roll 20 with the result that printed matter is applied to one side of the bottle. The bottle, as it moves past the fixed gear or rack 242 or other rotating means, is rotated 180 degrees so that the opposite face of the bottle is presented to the printing roll 21 to receive printed matter therefrom. The bottle with the printing thereon now passes back towards the turret 23 and therebeneath in alignment with one of the second bottle supports 43 due to the fact that the conveyor 24 has an odd number of bottle holders 156. As the printed bottle comes into alignment with the second bottle support 43, the second bottle support 43 is projected outwardly from the main part of the turret 23 so that the fingers 84 of the bottle holder 82 spring around the bottle in the relation shown in FIGURE 5. The projection of the bottle holder 82 is limited so that the plate 83 does not engage the bottle so as to guard against the smearing of the wet ink. As the conveyors 24 and the turret 23 continue to move, the bottle holder 156 passes the cam member 241 and the operating member 233 is rotated so as to rotate the valve member 223 to a position whereby the cylinder 203 is exhausted and the plunger assembly 209, as viewed in FIGURE 8A, moves to the right. As the bottle is released by the plunger assembly 209, the bottle ejector 198 is actuated to eject the bottle from the bottle base receiving member 188 and to move the bottle to the right. The bottle holder 82 moves to the right with the bottle against the resistance of the spring 81.

The printed bottle moves clockwise around the turret 23 until it becomes aligned with one of the pins or plungers 247 of the bottle pickup device 25. At this time, the pin 247 is projected by the operation of the cam 248 so that it enters into the neck 108 of the bottle carried by the second bottle support 43. As the pin 247 is firmly seated in the neck of the bottle, the second bottle support 43 is retracted, whereby the bottle is released from the bottle holder 82.

The printed bottle moves with the bottle pickup device 25 until the pin 247 on which it is mounted is retracted and the bottle is deposited on the discharge chute 26.

From the foregoing, it will be seen that novel and advantageous provision has been made for carrying out the desired end. However, attention is again directed to the fact that variations may be made in the example method and apparatus disclosed herein without departing from the spirit and scope of the invention, as defined in the appended claims.

We claim:

1. An apparatus for printing on bottles and the like having an arcuate printed matter receiving surface, said apparatus comprising a printing member movable about an arcuate path, and a bottle conveyor for moving bottles past said printing member and in contact therewith, said bottle conveyor including an endless conveyor member, supports for said conveyor member including a wheel type support adjacent said printing member for changing the direction of movement of said conveyor member, and bottle supports carried by said conveyor member, said wheel type support having a shaft with an axis spaced from said printing member a distance equal to the radius of curvature of said printed matter receiving surface, whereby a bottle carried by said bottle conveyor is moved in an arcuate path during a printing operation by the movement of the conveyor member about said shaft axis.

2. The apparatus of claim 1 wherein said shaft has adjustable mounting means for supporting said shaft at a desired distance from said printing drum corresponding to the radius of curvature of the surface on which printing is to be effected, and said wheel type support is replaceable.

3. An article handling system comprising an article feed; combination article supplying and article take-away conveyor means disposed adjacent to said article feed for receiving articles to be worked upon therefrom; second conveyor means disposed adjacent to and for receiving the articles from said combination article supplying and article take-away conveyor means for moving the articles past a work station and for returning the worked upon articles to said combination article supplying and article take-away conveyor means; and article pick-up conveyor means disposed adjacent to and for receiving the worked upon articles from said combination article supplying and article take-away conveyor means, wherein the articles to be handled thereby each has an arcuate printed matter receiving surface and said work station includes a printing drum, and said second conveyor means includes an endless conveyor member, supports for said conveyor member including a wheel type support adjacent said printing drum for changing the direction of movement of said conveyor member, and article supports carried by said conveyor member, said wheel type support having a shaft with an axis spaced from said printing drum a distance equal to the radius of curvature of said printed matter receiving surface, whereby an article carried by said second conveyor means is rotated during a printing operation by the movement of the conveyor member about said shaft axis.

4. A bottle handling system for handling bottles in the presentation thereof to a printing station or like work stations, said system comprising an article feed in the form of a gravity type storage rack, a first turret disposed below said storage rack and rotating in a vertical plane, said first turret having alternating first and second bottle supports, only said first bottle supports receiving bottles from said storage rack, each of said first bottle supports having at least one suction member for engaging and holding a bottle to remove the lowermost bottle from said storage rack, a bottle conveyor for receiving bottles from said first bottle supports and moving the bottles through said work station, said bottle conveyor including an endless conveyor member and third bottle supports carried by said endless conveyor member for receiving bottles from said first bottle supports, said third bottle supports each including a bottle bottom receiving socket and a plunger for insertion into the neck of a bottle, said socket and said plunger being in opposed relation, the spacing between said third bottle supports corresponding to the spacing between said first and second bottle supports and there being an odd number of third bottle supports, said second bottle supports being generally of the cradle type for engaging intermediate portions of bottles carried by said third bottle supports and removing the bottles subsequent to the passage thereof through said printing station, and a bottle pick-up unit having pin type bottle supports for entrance into the necks of bottles for removing the bottles from said second bottle supports.

5. The bottle handling apparatus of claim 4 wherein the bottles to be handled thereby each has an arcuate printed matter receiving surface and said work station includes a printing drum, and supports for said conveyor member including a wheel type support adjacent said printing drum for changing the direction of movement of said conveyor member and the bottles carried thereby, said wheel type support having a shaft with an axis spaced from said printing drum a distance equal to the radius of curvature of said printed matter receiving surface, whereby a bottle carried by said bottle conveyor is rotated during a printing operation by the movement of the conveyor member about said shaft axis.

6. The bottle handling system of claim 4 wherein said second supports are normally spring urged to retracted positions, and means are provided to project said second supports for receiving bottles from said third supports.

7. An apparatus for printing on bottles and the like of the type having two circumferentially spaced arcuate printed matter receiving surfaces, said apparatus comprising a pair of printing members disposed in spaced relation and each being mounted for movement in an arcuate path, a bottle conveyor for moving bottles past said printing members and in contact therewith, said bottle conveyor including an endless conveyor member, supports for said endless conveyor member including a wheel type support adjacent each of said printing members for changing the direction of movement of said conveyor member, bottle supports, means carried by said conveyor member mounting said bottle supports for rotary movement, each of said wheel type supports having a shaft with an axis spaced from a respective one of said printing members a distance equal to the radius of curvature of a respective one of said printed matter receiving surfaces, whereby a bottle carried by said bottle conveyor is rotated about a respective one of said shaft axes during a printing operation by the movement of the conveyor member about said respective shaft axis, means for preventing the rotation of said bottle supports in the immediate vicinity of said printing members, and means for rotating said bottle supports intermediate said printing members.

8. The apparatus of claim 7 wherein said rotation preventing means include a fixed cam and a follower connected to said bottle support.

9. The apparatus of claim 7 wherein said bottle support rotating means includes a fixed gear and a gear connected to said bottle support for engagement with said fixed gear.

10. The apparatus of claim 7 wherein said bottle support mounting means include a first mounting member secured to said conveyor member, a second mounting member, means pivotally connecting one end of said second mounting member to said first mounting member, and adjustable means adjustably connecting the other end of said second mounting member to said first mounting member to vary the angle of the axis of a bottle relative to said first mounting member, whereby tapered bottles may be accommodated.

11. The apparatus of claim 7 wherein each of said bottle supports includes a socket for receiving a base portion of a bottle, a plunger for insertion into the neck of a bottle to hold a bottle in said socket, and means mounting said plunger including means for projecting and retracting said plunger, said plunger mounting means including a cylinder receiving one end of said plunger wherein said plunger end functions as a piston, valve means for admitting compressed fluid into said cylinder for projecting said plunger, said plunger having a tubular other end having an air passage, and valve means of which said plunger is a part placing said air passage in communication with said compressed fluid when said plunger is projected to internally pressurize a bottle when said plunger is seated therein, said last mentioned valve means including a pressure reducing valve for controlling the internal pressurizing of the bottle.

12. The apparatus of claim 7 wherein each of said bottle supports includes a socket for receiving a base portion of a bottle, a plunger for insertion into the neck of a bottle to hold a bottle in said socket, and means mounting said plunger including means for projecting and retracting said plunger.

13. The apparatus of claim 12 together with a spring loaded ejector projecting into said socket for ejecting a bottle therefrom when released by said plunger.

14. The apparatus of claim 12 wherein said plunger mounting means includes a cylinder receiving one end of said plunger wherein said plunger end functions as a piston, valve means for admitting compressed fluid into said cylinder for projecting said plunger, said plunger having a tubular other end having an air passage, and valve means of which said plunger is a part placing said air passage in communication with said compressed fluid when said plunger is projected to internally pressurize a bottle when said plunger is seated therein.

15. A combination article supplying and article take-away turret comprising a carrier having an even number of equally spaced stations, first and second article supports disposed at said stations in alternating relation, said first article supports each having at least one suction head for picking up articles from a supply source and delivering the articles to a mechanism which includes means for conveying the articles to a first printing station, means for thereafter rotating the articles and means for conveying the articles to a second printing station, said second article supports each including an article holder for receiving one of the articles from the mechanism, means normally retaining said second article supports in a retracted position to clear the articles of the supply source, and means for projecting said second article supports to receive the article from the mechanism.

16. The turret of claim 15 wherein said turret is particularly adapted for handling bottles with curved surfaces and the axis of each suction head is disposed at an angle to the axis of its respective support in advance thereof to facilitate engagement of said suction head with the curved surfaces of bottles.

17. In an article handling system including an article feed means and an article handling means comprising means for conveying the articles through a first work station, means for thereafter rotating the articles and means for subsequently conveying the articles through a second work station, the improvement comprising a combination article supplying and article take-away turret comprising a carrier having an even number of equally spaced stations, first and second article supports disposed at said stations in alternating relation, said first article supports each having means for picking up articles from a supply source and delivering the articles to said article handling means, and said second article supports each having means for receiving the articles from the article handling means.

18. In an article handling system including an article feed means, a conveyor for conveying articles through first and second work stations and a device for rotating the articles between said work stations, the improvements comprising an article handling apparatus comprising a turret, said turret having an even number of stations with alternating stations having first means for delivering articles to said conveyor and second means for receiving the articles from the conveyor.

19. In an article handling system including an article feed means and a conveyor for conveying articles at least through one work station, the improvement comprising an article handling apparatus comprising a turret, said turret having an even number of stations with alternating stations having first means for delivering articles to said conveyor and second means for receiving the articles from the conveyor, said conveyor having an odd number of stations and receiving articles in only alternating stations, the point of transfer from said turret to said conveyor being coincidental with the point of transfer from said conveyor back to said turret.

20. In an article handling system including an article feed means and a conveyor for conveying articles at least through one work station, the improvement comprising an article handling apparatus comprising a turret, said turret having an even number of stations with alternating stations having first means for delivering articles to said conveyor and second means for receiving the articles from the conveyor, said conveyor having an odd number of stations and receiving articles in only alternating stations, each of said conveyor supports having a bottle support requiring the shifting of the bottle axially of said turret, and each of said turret stations having an article support mounted for axial movement and resiliently restrained thereagainst.

21. In an article handling system including an article feed means and a conveyor for conveying articles at least through one work station, the improvement comprising an article handling apparatus comprising a turret, said turret having an even number of stations with alternating stations having first means for delivering articles to said conveyor and second means for receiving the articles from the conveyor, said conveyor having an odd number of stations and receiving articles in only alternating stations, each of said conveyor supports having a bottle support requiring the shifting of the bottle axially of said turret, and each of said turret stations having an article support mounted for axial movement and resiliently restrained thereagainst, adjacent ones of said turret article supports being movable in opposite directions.

22. A bottle handling system for handling bottles in the presentation thereof to a printing station or like work stations, said system comprising an article feed means, a turret disposed adjacent to said feed means, said turret having alternating first and second bottle supports, only said first bottle supports receiving bottles from said feed means, a bottle conveyor for receiving bottles from said first bottle supports and moving the bottles through said work station, said bottle conveyor including an endless conveyor member and third bottle supports carried by said endless conveyor for receiving bottles from said first bottle supports, the spacing between said third bottle supports corresponding to the spacing between said first and second bottle supports and there being an odd number of third bottle supports, said second bottle supports being generally of the cradle type for engaging portions of bottles carried by said third bottle supports and removing the bottles therefrom subsequent to the passage thereof through said printing station, and a bottle pick-up unit for removing bottles from said second bottle supports.

23. A bottle handling system for handling bottles in the presentation thereof to a printing station or like work stations, said system comprising an article feed means, a combination article supplying and article take-away turret disposed adjacent to said feed means for receiving articles to be worked upon therefrom, said turret having alternating first and second bottle supports, only said first bottle supports receiving bottles from said feed means, a bottle conveyor for receiving bottles from said first bottle supports and moving the bottles through said work station, said bottle conveyor including an endless conveyor member and third bottle supports carried by said endless conveyor for receiving bottles from said first bottle supports, the spacing between said third bottle supports corresponding to the spacing between said first and second bottle supports and there being an odd number of third bottle supports, said second bottle supports engaging the bottles carried by said third bottle supports and removing the bottles therefrom subsequent to the passage thereof through said station, and a bottle pickup for removing bottles from said second bottle supports.

24. A bottle handling system for handling bottles in the presentation thereof to a printing station or like work stations, said system comprising an article feed means, a combination article supplying and article take-away turret disposed adjacent to said feed means for receiving articles to be worked upon therefrom, said turret having alternating first and second bottle supports, only said first bottle supports receiving bottles from said feed means, a bottle conveyor for receiving bottles from said first bottle supports and moving the bottles through said work station, said bottle conveyor including an endless conveyor member and third bottle supports carried by said endless conveyor for receiving bottles from said first bottle supports, the spacing between said third bottle supports corresponding to the spacing between said first and second bottle supports and there being an odd number of third bottle supports, and said second bottle supports engaging the bottles carried by said third bottle supports and removing the bottles therefrom subsequent to the passage thereof through said station.

25. A bottle handling system for handling bottles in the presentation thereof to a printing station or like work stations, said system comprising an article feed means, a combination bottle supplying and a bottle take-away means disposed adjacent to said feed means for receiving articles to be worked upon therefrom, said bottle supplying and bottle take-away means having alternating first and second bottle supports, only said first bottle supports receiving bottles from said feed means, a bottle conveyor for receiving bottles from said first bottle supports and moving the bottles through said work station, said bottle conveyor including an endless conveyor member and third bottle supports carried by said endless conveyor for receiving bottles from said first bottle supports, the spacing between said third bottle supports corresponding to the spacing between said first and second bottle supports and there being an odd number of third bottle suports, said second bottle supports being generally of the cradle type for engaging portions of bottles carried by said third bottle supports and removing the bottles therefrom subsequent to the passage thereof through said printing station, and a bottle pick-up unit for removing bottles from said second bottle supports.

26. An article handling system for handling articles in the presentation thereof to a work station, said system comprising an article feed means, a combination article supplying and article take-away means, said combination means having first and second article supports, only said first article supports receiving articles from said feed means, an article conveyor for receiving articles from said first article supports and moving the articles through said work station, said article conveyor including third article supports for receiving articles from said first article supports, and said second article supports positioned to receive the articles carried by said third article supports and to remove the articles therefrom subsequent to the passage of the articles through said work station.

27. A method of printing on bottles and the like having a first arcuate surface comprising the steps of supporting the bottle for rotation, moving the bottle towards a printing roll, and while the bottle is in the vicinity of the printing roll simultaneously holding the bottle against rotation and moving the arcuate surface of the bottle into contact with the printing roll and about the center of curvature of the arcuate surface of the bottle, rotating the bottle to present a second surface and printing on said second surface.

28. A method of printing on bottles and the like having first and second spaced arcuate surfaces, the method comprising the steps of supporting the bottle for rotation, moving the bottle towards a first printing roll, while the bottle is in the vicinity of the first printing roll simultaneously holding the bottle against rotation and moving the first arcuate surface into contact with the first printing roll and about the center of curvature of the first arcuate surface, rotating the bottle to present the second arcuate surface, moving the bottle towards a second printing roll, and while the bottle is in the vicinity of the second printing roll simultaneously holding the bottle against rotation and moving the second arcuate surface into contact with the second printing roll and about the center of curvature of the second arcuate surface.

References Cited in the file of this patent

UNITED STATES PATENTS

| | | |
|---|---|---|
| 1,661,178 | Jobst | Mar. 6, 1928 |
| 1,887,211 | Mortimer | Nov. 8, 1932 |
| 2,409,368 | Lipton | Oct. 15, 1946 |
| 2,950,805 | Heimlicher et al. | Aug. 30, 1960 |
| 2,971,629 | Black | Feb. 14, 1961 |